Sept. 4, 1923.  1,467,041
O. E. JOHNSON
TRANSPORT DEVICE FOR GRAIN AND THE LIKE
Filed April 19, 1922   2 Sheets-Sheet 1
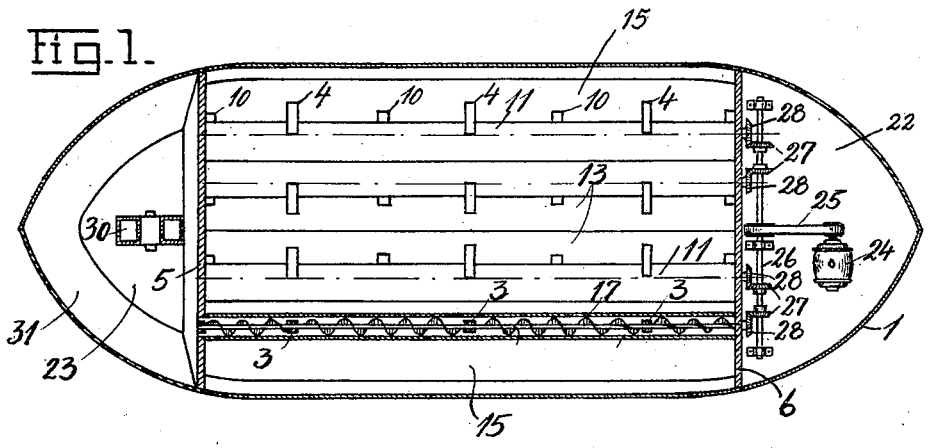
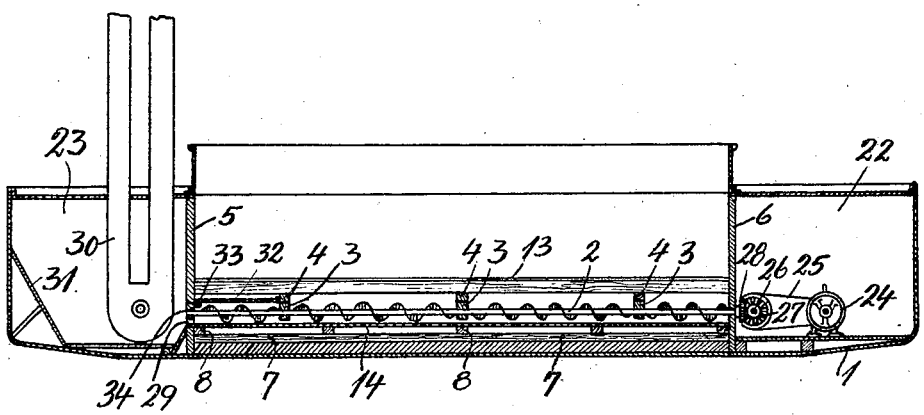

Sept. 4, 1923.  
O. E. JOHNSON  
TRANSPORT DEVICE FOR GRAIN AND THE LIKE  
Filed April 19, 1922    2 Sheets-Sheet 2
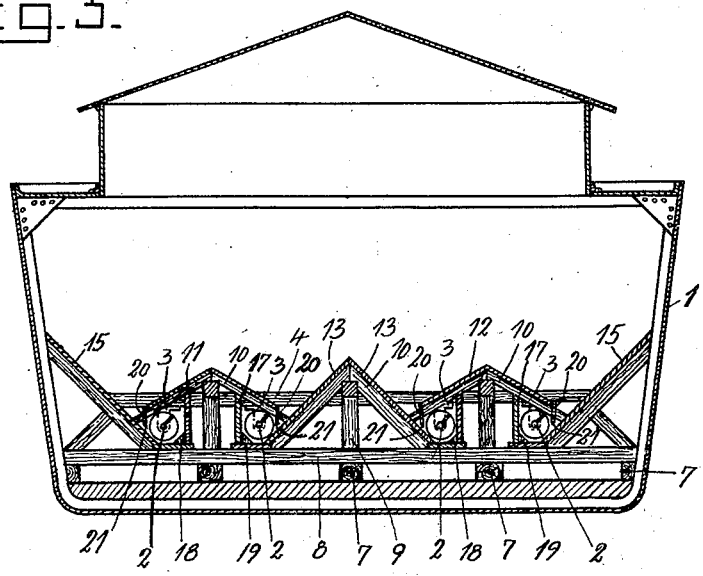
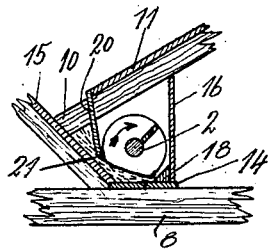 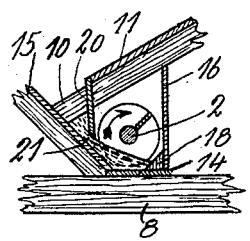 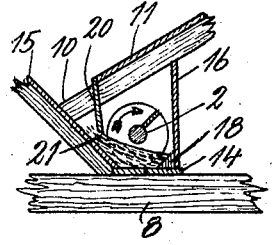

Patented Sept. 4, 1923.

1,467,041

UNITED STATES PATENT OFFICE.

OTTO EMIL JOHNSON, OF SKIEN, NORWAY.

TRANSPORT DEVICE FOR GRAIN AND THE LIKE.

Application filed April 19, 1922. Serial No. 555,633.

*To all whom it may concern:*

Be it known that I, OTTO EMIL JOHNSON, citizen of Norway, residing at Skien, Norway, have invented certain new and useful Improvements in Transport Devices for Grain and the like (for which I have filed an application in Denmark Dec. 22, 1920, No. 22,581), of which the following is a specification.

Hitherto the unloading of grain and the like from barges, ships etc., was accomplished by shifting the barge or ship forward and backward, in order to secure that the grain elevator was properly fed with grain. Moreover lumpers had to be employed for the removal of the grain from the parts of the holds lying outside of the range of the transporter.

This method of unloading involves several drawbacks, because the ship or barge—on account of the circumstance that the discharge takes place only at one point at a time—will get out of trim. Moreover, a large number of workers are needed, because the lumpers cannot work in the holds for a long period, but have to leave the hold frequently for fresh air, on account of the great masses of dust, which are created by the shovelling of the grain.

These drawbacks are overcome by the present invention, the object of which is to conduct the grain into a collecting chamber, into which the grain elevator is placed. In this way the same amount of grain is removed from each part of the loaded hold in the longitudinal direction, whereby the barge or ship is kept in trim during the entire unloading operation.

In the accompanying drawing in which one embodiment of my invention is shown by way of example, Fig. 1 shows a barge from above with the new device partly in section.

Fig. 2 is a vertical longitudinal section through the barge.

Fig. 3 is a cross section through the same.

Figs. 4–6 show constructional details.

In the longitudinal direction of the barge 1 a plurality of conveyor screws 2 are arranged in bearings 3, which are fastened to the beams 4 and to the bulkheads 5 and 6. In the bottom of the barge longitudinal beams 7 and transverse beams 8 are arranged. These beams form a support for the device which is thus placed on a higher level than the bottom of the barge. Upon the upper beams 8 a frame is raised, consisting of posts 9 and roof supports 10, upon which the inclined roofs 11 and 12 are laid, which are arranged in such manner, that the ridge becomes situated intermediate two screws. Each of these is thus covered by one half of the roof. Between the pairs of conveyor screws covered by the roofs 11 and 12, inclines 13 are arranged, which meet in an edge lying longitudinally between the pairs of conveyor screws. The inclines are extended below the adjacent screw to a floor 14, which extends the entire length of the screw. Between the screws of each pair partitions 16 and 17 are built in between the floor 14 and the roof, so that each screw is enclosed in a channel or passage. In order that this shall surround as closely as possible the screw, the corners between the partitions 16 and 17 and the floor 14 may be equipped with lists 18 and 19.

From the roofs 11 and 12 depend walls 20 on the outer side of each pair of screws. These walls are extended so far towards the inclines 13 and 15, that only a slot 21 is left open. This slot serves as a feed opening to the screw. In each end of the barge, compartments 22 and 23 are provided which are separated from the hold by means of bulkheads 5 and 6. In the compartment 22 the operating mechanism for the conveyor screws is arranged. This mechanism may consist of an electric motor 24, which by means of a belt 25 operates a shaft 26 carrying a toothed wheel 27, which meshes with the toothed wheels 28 on the ends of the screws 2. The wheels 27 are so arranged, that each screw is rotated in a direction contrary to the current of grain coming in through the corresponding feed opening 21. In the bulkhead 5 openings 29 are arranged, so that the grain will be fed into the compartment 23, the bottom of which on account of the beams 7 and 8 lies on a lower level than the bottom of the passages enclosing the screws. In the compartment 23 the grain elevator 30 is placed, which serves for removing the grain from the barge.

Further, the compartment 23 is equipped with inclines 31 from the surrounding walls, so that the grain is brought as near as possible to the elevator to properly feed.

When the barge is loaded with grain, this will cover the roofs 11 and 12 and the inclines 13 and 15. The conveyor screws will be freely movable and are filled with grain only up to a height corresponding to the opening in the slot 21. If now the motor 24 is actuated it will rotate the screws 2 by means of the belt and gearings. These will feed the grain forward through the openings 29 into the compartment 23, in which the grain elevator is arranged, which will take care of the further transport of the grain. A continuous current of grain will thus flow from the hold into the compartment 23, until the hold is emptied, because the inclines 13, 15 and the roofs 11, 12 continuously will conduct the grain to the slots 21 from the hold. Because the screws are rotating against the feeding slots 21, the unrestricted inflow of the grain will be counteracted, so that the screws will not be completely filled with grain, but only up to a height corresponding to the height of the slot 21. In order to keep the barge in trim during the unloading operation, the grain must be fed to the screws in equal quantities from over the entire length of the hold. This is obtained by arranging the different sections of the slots 21 at different heights from one end of the screw to the other.

This is shown clearly in Figures 4 to 6, in which the feeding slot 21 as shown has three different widths. The hold is subdivided into three sections and into the first section, lying next to the compartment 22, the grain is fed to the height shown in Fig. 4. When the grain reaches the middle section a similar amount of grain will be admitted to the screw, because the slot 21 at this point is of a greater width, so that the grain in the screws will reach the height shown in Fig. 5. In the third or last section a quantity equal to the amount of the first and second sections will be admitted, so that the entire height of the grain in the screws will be as shown in Fig. 6. In this manner the barge will always be kept in trim.

If the grain elevator should stop, or other interruptions should occur, whereby the compartment 23 and also the screws 2, would become clogged, and undue pressure would be exerted upon the screws, the screws might be damaged. In order to avoid this an emergency means is arranged for each screw, which will stop the rotation of the machinery. When, however, the grain elevator again comes into operation and discharges the compartment 23 down to its normal volume during the unloading the screws will automatically be brought into action.

The said emergency means may consist of a board 32, the one end of which is pivotally connected to the beam 4, and the other end of which is extended to the upper edge of the openings 29 in the bulkhead 5. Here the board is equipped with a contact piece 33, which is loosely fitted into another contact piece 34, fastened upon the bulkhead 5. This contact device may suitably be included in the magnet circuit of the motor, so that when the grain is packed under the board 32, and the latter thereby is lifted, the circuit will be broken and the motor stopped. When the compartment 23 is again emptied the grain which is packed under the board 32 will flow through the openings 29 into the compartment 23, whereby the board drops down and again closes the circuit, so that the motor once more comes into operation.

It will be understood that my device may also be used for conveying other materials, for instance sand, salt, coal, etc., in which case the screws and the feed openings are made and dimensioned to suit the nature of the material to be conveyed.

The amount of grain which is fed forward may always be regulated either by reducing the speed of rotation of the screws, or by stopping one or more of the screws. This may suitably be done by arranging clutch-couplings between the wheels 27 (which in this case must be loose) and the shaft 26, so that the screws may be connected or disconnected as desired.

The expensive silos may be dispensed with when the conveyor above described is used. Instead of silos, common sheds of a simple construction and of any desired size may be used for storing the grain. When the described arrangement is built in so that it forms the bottom of the shed, the grain may be discharged from the same at one or the other end as desired.

I claim as my invention—

1. In a conveying device for grain, the combination with the conveying mechanism and means for operating the same, of an inclined roof-structure arranged above the said conveying mechanism for supporting the material to be conveyed, an inclined surface extending under said roof structure in close proximity to said conveying mechanism and a depending wall forming with the said inclined surface a continuous slot for gradually feeding the material to said conveying mechanism.

2. In a conveying device for grain, the combination with the conveying mechanism and means for operating the same, of an inclined roof-structure arranged above said conveying mechanism for supporting the material to be conveyed, an inclined surface extending under said roof structure in close proximity to said conveying mechanism, a depending wall forming with the said inclined surface a continuous slot for gradually feeding the material to said conveying mechanism, a collecting compartment in communication with said conveying mechanism, and a means in said collecting compartment for elevating the material collected therein.

3. In a conveying device for grain, the combination with a plurality of conveying screws arranged in pairs and means for operating the same, of an inclined roof structure arranged above each pair of screws, partition walls between the screws of each pair, inclined surfaces extending under the said roof structures in close proximity to said screws, and depending walls forming with the said inclined surfaces continuous slots extending along one side of said screws constituting a longitudinal opening for gradually feeding the material to be conveyed to said screws.

4. In a conveying device for grain, the combination with a plurality of conveying screws arranged in pairs and means for operating the same, of an inclined roof structure arranged above each pair of screws, partition walls between the screws of each pair, inclined surfaces extending under the said roof structures in close proximity to said screws, and depending walls forming with the said inclined surfaces continuous slots extending along one side of said screws constituting a longitudinal opening for gradually feeding the material to be conveyed to said screws, the said longitudinal opening being made of different heights along different parts of the said screws.

5. In a conveying device for grain, the combination with a plurality of conveying screws arranged in pairs and means for operating the same, of an inclined roof structure arranged above each pair of screws, partition walls between the screws of each pair, inclined surfaces extending under the said roof structures in close proximity to said screws, depending walls forming with the said inclined surfaces continuous slots extending along one side of said screws constituting a longitudinal opening for gradually feeding the material to be conveyed to said screws, a separate compartment containing the means for operating the said screws, a common collecting compartment in communication with the delivery ends of said screws, and a means in said collecting compartment for continuously elevating the material collected therein.

In testimony whereof I affix my signature in presence of two witnesses.

OTTO EMIL JOHNSON.

Witnesses:
 AXEL LAHN,
 HANS HALL.